(12) United States Patent
Chakravarty et al.

(10) Patent No.: US 9,210,780 B2
(45) Date of Patent: Dec. 8, 2015

(54) STREET LIGHTING SYSTEM ALLOWING MULTIPLE COMMUNICATION

(71) Applicant: GreenStar Products Limited, San Antonio, TX (US)

(72) Inventors: Jyotirmoy Chakravarty, Boerne, TX (US); Sarosij Sengupta, Gurgaon (IN)

(73) Assignee: GREENSTAR PRODUCTS LIMITED, San Antonio, TX (US)

( * ) Notice: Subject to any disclaimer, the term of this patent is extended or adjusted under 35 U.S.C. 154(b) by 450 days.

(21) Appl. No.: 13/624,133

(22) Filed: Sep. 21, 2012

(65) Prior Publication Data

US 2014/0084797 A1    Mar. 27, 2014

(51) Int. Cl.
*H05B 37/00* (2006.01)
*H05B 37/03* (2006.01)
*H05B 37/02* (2006.01)

(52) U.S. Cl.
CPC .......... *H05B 37/034* (2013.01); *H05B 37/0272* (2013.01); *Y02B 20/72* (2013.01)

(58) Field of Classification Search
USPC ......... 315/88, 89, 90, 93, 120, 119, 121, 129, 315/130, 131, 132, 133, 185 R, 192, 292, 315/293, 294, 295, 291, 297, 299, 300, 301, 315/302, 307, 312, 360, 361
See application file for complete search history.

(56) References Cited

U.S. PATENT DOCUMENTS

2011/0001626 A1 *    1/2011    Yip .................... H05B 37/0263
                                                                    340/635

* cited by examiner

*Primary Examiner* — Douglas W Owens
*Assistant Examiner* — Jianzi Chen
(74) *Attorney, Agent, or Firm* — Banner & Witcoff, Ltd.

(57) ABSTRACT

The invention provide a street lighting system that includes a plurality of Light Emitting Diode based street lamps, wherein each of the Light Emitting Diode based street lamps includes a Light Emitting Diode light source, a control circuit connected to the Light Emitting Diode light source and a communication transceiver electrically coupled to the control circuit. The control circuit is enabled to collect data from peripheral devices attached to the Light Emitting Diode based street lamps and transmits the collected data through the communication transceiver. Also provided is an electrical distribution network that supplies electrical power to each of said Light Emitting Diode based street lamps and a central server connected to the electrical distribution network, wherein the central server controls operation of each of the Light Emitting Diode based street lamps and is connected to the control circuit through the electrical distribution network such that it can send and receive signals from the control circuit via the communication transceiver.

18 Claims, No Drawings

STREET LIGHTING SYSTEM ALLOWING MULTIPLE COMMUNICATION

FIELD OF INVENTION

The invention disclosed herein relates, in general, to street lighting. More specifically, the present invention relates to intelligent street lighting system created on an open architecture platform allowing multiple independent channels in a wireless or wire-line communication networks.

BACKGROUND

The demand for energy-efficient Solid State Lighting (SSL) based lighting devices is driven by various factors such as improved energy efficiency, enhanced product life, lower maintenance costs, and reduced environmental impact. An example of the SSL based lighting devices that uses inorganic semiconductors is a Light Emitting Diode (LED) lighting device.

Further, network of street lamps is widely available and present throughout, giving an opportunity for using street lamps for purposes additional to just lighting. The increase in street lighting network necessitates adapting intelligent control of the lights from a remote command center location. In addition the wide network of street lighting systems light poles make it ideal for attachment of peripheral devices for myriad of applications. However, current street lights do not provide an acceptable method of long distance communication to facilitate transfer of information.

In light of the above discussion, there is a demand for street lighting systems that facilitates multiple modes of communication that resides in a open plug and play architecture.

SUMMARY

The instant exemplary embodiments provide a method and a system for an intelligent LED based street lamp network system.

An embodiment of the invention provides a system for controlling and operating multiple communication channels on a single LED light fixture. This embodiment is applicable on an LED lighting system that operates on an open architecture backplane. For example, a single supervisory circuit with a micro controller provides the intelligence to drive multiple communication modules and the communication modules provide the opportunity for independent channels of bi-directional communication from remotely located command centers.

Another embodiment of the invention enables a micro controller to take the actions communicated from remotely located control center to control the performance of the light fixture. The micro controller can use an open architecture back plane to receive communicated instructions to control the performance of the lights. is also used to provide signal to control the light fixture. The supervisory Micro Controller may also be able to make decisions in accordance to commands received from the remote control and send controlling signal to any section of the fixture. In the same way the Micro Controller can query any part of the fixture based on the inquiry received from the remote control center.

Some further embodiments of the present invention provide a USB or RJ45 connector provided for plugging in electronic accessories that are capable of performing functions based on the commands received by the Micro Controller. The commands are received from the communication channels from remote control centers. The accessories are in turn able to send information selectively over a communication channel to remote locations. The supervisory Micro Controller acts as a "thin client" and is not designed to make any on board decisions.

Further embodiments of the invention provide communication channels that may be selected based on what is required for the data transmission. They can be Power Line Communication, Low power RF, GSM/GPRS, WiFi, etc or any combination of two or more channels.

Furthermore, some embodiments of the present invention provide a case where two communication channels that are selected and happen to be close together on the frequency of operation, they will transmit or receive to mitigate any interference or create noise.

DESCRIPTION OF THE EXEMPLARY EMBODIMENTS

Before describing the present invention in detail, it should be observed that the present invention utilizes apparatus components and method steps to describe systems and methods related to intelligently networked street lights. Accordingly, the apparatus components and the method steps have been represented, wherever appropriate, by conventional symbols in the drawings, showing specific details that are pertinent for an understanding of the present invention. Only the specific details are shown so as not to obscure the disclosure with details that will be readily apparent to those with an ordinary skill in the art having the benefit of the description herein.

While the specification concludes with the claims defining the features of the present invention that are regarded as novel, it is believed that the present invention will be better understood from a consideration of the following description in conjunction with the drawings, in which like reference numerals are carried forward.

As required, detailed embodiments of the present invention are disclosed herein; however, it is to be understood that the disclosed embodiments are merely exemplary of the present invention, which can be embodied in various forms. Therefore, specific structural and functional details disclosed herein are not to be interpreted as limiting, but merely as a basis for the claims and as a representative basis for teaching one skilled in the art to employ variously the present invention in virtually any appropriately detailed structure. Further, the terms and phrases used herein are not intended to be limiting, rather they provide a better understanding of the description of the present invention.

The terms "a" or "an", as used herein, are defined as one or more than one. The term "another", as used herein, is defined as at least a second or more. The terms "including" and/or "having" as used herein, are defined as comprising (i.e. open transition).

Further, functional units have been described here, many of which have been referred to as modules in order to emphasize, more particularly, their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

The other functional units may be implemented in software for execution by various types of processors. A computer program product including an executable code may, for instance, comprise one or more physical or logical blocks of computer instructions which may, for instance, be organized as an object, procedure, or function. The executables of the computer program product may not be physically located together, but may comprise disparate instructions stored in different locations which, when joined logically together, comprise the functional units. A module and/or a program of executable code may be a single instruction or a set of instructions, and may even be distributed over different code segments, among different programs, and across several memory devices.

The various apparatus/system components and/or the modules discussed herein may include one or more of the following: a host server or other computing systems including a processor for processing digital data; a memory coupled to the processor for storing digital data; an input digitizer coupled to the processor for inputting the digital data; an application program, stored in the memory and accessible by the processor, to direct processing of the digital data by the processor; a display device coupled to the processor and the memory for displaying information derived from the processed digital data; and a plurality of databases.

Further, those skilled in the art will appreciate that any computer discussed herein may include an operating system (e.g., Windows 7, Vista, NT, 95/98/2000, OS2; UNIX; Linux; Solaris; Mac OS; etc.) as well as various conventional support software and drivers typically associated with computers. The computers may be in a home or business environment with access to a network. In an exemplary embodiment, the access is through the Internet by means of a commercially available web browser software package.

In an embodiment of the present invention an LED based street lamp is provided. The LED based street lamp includes an LED light source, a control circuit, a power supply, a communication transceiver, and a lamp socket. The control circuit further connects to the other parts in the LED based street lamp and includes a microcontroller, a Read Only Memory (ROM), a Random Access Memory (RAM), and external ports.

The power supply provides current and working voltage for the LED light source and the control circuit. Each street lamp is also configured to be uniquely identified by a remote, central server. In one embodiment, the unique identification code is stored in the ROM.

The LED based street lamp further includes one of a current sensor, a temperature sensor, and a luminance sensor that monitor the operation of the LED light source and provides a warning signal if any unusual condition is detected.

Operationally, in an embodiment, the central server may send a data packet including an identification code for the street lamps, and a set of instructions for the street lamp to execute. The control circuit of each street light examines the identification code and if it matches that of the street lamp, then control circuit can then execute the command.

The command may be either to switch on the street lamp, to switch it off, or to modify its luminance to a specific value. The control circuit can then control the power supply that supplies power to the LED light source. Meanwhile, at the same time the control circuit of an individual street lamp can also send status information using the communication transceiver back to the central server.

In another embodiment, the luminance sensor can be a means for monitoring the luminance of the environment as well as the LED light source. Further, the current sensor can monitor the current sent to the LED light source and be a part of a larger metering network. In addition the temperature sensor can monitor the overall temperature within the enclosure of the LED street lamp and specifically the temperature of the LED light source.

In another embodiment the LED based street lamp can further include various peripheral devices connected to its external ports, which can communicate with third parties through the central server. For example, one or more cameras may be installed on street lamp poles to monitor the real-time traffic on the road and send captured information to a traffic control or surveillance control system via the central server for further use. Further, the information sent across is encrypted using a 128-bit encryption and can be done through the same communications network being used by the street lighting system. Also, the information is not tampered with at any stage ensuring that no harm comes to it during transfer. Furthermore, in an embodiment the power line infrastructure can be used as the media for both supplying power and transmitting data. In such a case there is no need to add additional hardware to the existing street lamps and hence the cost of establishing such a system is kept to minimum.

In real life applications, the control circuit for example, a single supervisory circuit with a micro controller provides the intelligence to drive multiple communication modules and the communication modules provide the opportunity for independent channels of bi-directional communication from the central server or remotely located command centers.

In further embodiments, the sensors can also enable sensing the presence and activity of individuals to control the light level for surveillance and can also enable display of advertisements for publicity on display screens upon detection of the presence of a person.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but it is to be understood in the broadest sense allowable by law.

All documents referenced herein are hereby incorporated by reference.

What is claimed is:

1. A street lighting system comprising:
   a plurality of Light Emitting Diode based street lamps, each of the Light Emitting Diode based street lamps comprising:
   a Light Emitting Diode light source;
   a control circuit connected to the Light Emitting Diode light source;
   a communication transceiver electrically coupled to the control circuit; and
   an external port configured to connect with one or more peripheral devices, wherein the control circuit is configured to collect data from the one or more peripheral devices attached to the external port and to transmit the collected data through the communication transceiver;
   an electrical distribution network configured to supply electrical power to each of said Light Emitting Diode based street lamps; and
   a central server connected to the electrical distribution network, wherein the central server is configured to control operation of each of the Light Emitting Diode based street lamps, wherein the central server is further connected to the control circuit through the electrical distribution network and further configured to send and receive signals from the control circuit via the communication transceiver.

2. The street lighting system of claim 1 further comprising at least one of a luminance sensor, a current sensor, and a temperature sensor.

3. The street lighting system of claim 2, wherein the control circuit is configured to adjust the electrical power supplied to said Light Emitting Diode light source when the luminance sensor detects that ambient light has deviated from a pre-determined threshold.

4. The street lighting system of claim 1, wherein each of the Light Emitting Diode based street lamps further comprise a camera configured to capture street information on a street and to send the street information to the central server.

5. The street lighting system of claim 1, wherein each of the Light Emitting Diode based street lamps further comprises a speed radar gun configured to capture a vehicle on a road that travels at a speed exceeding a pre-defined threshold and to send information of the vehicle to the central server.

6. The street lighting system of claim 1, wherein each of the Light Emitting Diode based street lamps further comprises a display system, wherein information to be displayed on the display system is controlled by the central server.

7. The street lighting system of claim 1, wherein communication between the Light Emitting Diode based street lamps and the central server is using one of: a power-line network, the Internet and another wireless communication means.

8. The street lighting system of claim 1, wherein the control circuit is configured to control and operate one or more communication channels, thereby providing an open architecture backplane.

9. The street lighting system of claim 8, wherein the one or more peripheral devices are attached to the Light Emitting Diode based street lamps via any of the one or more communication channels.

10. A street lighting apparatus:
a Light Emitting Diode light source;
a control circuit connected to the Light Emitting Diode light source;
a communication transceiver electrically coupled to the control circuit and to an electrical distribution network providing a supply of electrical power; and
an external port configured to connect with one or more peripheral devices, wherein the control circuit is configured to collect data from the one or more peripheral devices attached to the external port and to transmit the collected data through the communication transceiver,
wherein the control circuit is configured to communicate with a central server through the electrical distribution network and to send signals to and receive signals from the central server via the communication transceiver, and
wherein the control circuit is configured to receive instructions for controlling operation of the street lighting apparatus from the central server.

11. The street lighting apparatus of claim 10, further comprising at least one of a luminance sensor, a current sensor, and a temperature sensor.

12. The street lighting apparatus of claim 11, wherein the control circuit is configured to adjust the electrical power supplied to said Light Emitting Diode light source when the luminance sensor detects that ambient light has deviated from a pre-determined threshold.

13. The street lighting apparatus of claim 10, further comprising a camera configured to capture street information on a street and to send the street information to the central server.

14. The street lighting apparatus of claim 10, further comprising a speed radar gun configured to capture a vehicle on a road that travels at a speed exceeding a pre-defined threshold and to send information of the vehicle to the central server.

15. The street lighting apparatus of claim 10, further comprising a display system, wherein information to be displayed on the display system is controlled by the central server.

16. The street lighting apparatus of claim 10, wherein communication with the central server is performed using one of: a power-line network, the Internet and another wireless communication means.

17. The street lighting apparatus of claim 10, wherein the control circuit is configured to control and operate one or more communication channels, thereby providing an open architecture backplane.

18. The street lighting apparatus of claim 17, wherein the one or more peripheral devices are attached via any of the one or more communication channels.

* * * * *